United States Patent
Roddie

[11] Patent Number: 5,987,767
[45] Date of Patent: Nov. 23, 1999

[54] ALIGNMENT JIG

[76] Inventor: Granville Roddie, 624 S. Alacia Ave., Compton, Calif. 40220

[21] Appl. No.: 08/897,909

[22] Filed: Jul. 21, 1997

[51] Int. Cl.⁶ ................................................. B27G 23/00
[52] U.S. Cl. ........................... 33/645; 33/628; 33/DIG. 1
[58] Field of Search ............................ 33/645, 613, 626, 33/628, 636, 637, 639, 533, DIG. 1

[56]  References Cited

U.S. PATENT DOCUMENTS

| 2,508,777 | 5/1950 | Smith | 33/613 |
|---|---|---|---|
| 2,645,194 | 7/1953 | Underwood | 33/613 |
| 2,700,993 | 2/1955 | Pence | 33/628 |
| 3,864,053 | 2/1975 | Harwood | 33/628 |
| 3,867,763 | 2/1975 | Wilkins | 33/639 |
| 4,888,875 | 12/1989 | Strother | 33/347 |
| 5,020,228 | 6/1991 | Hessenthaler | 33/628 |
| 5,131,161 | 7/1992 | Drag | 33/533 |
| 5,361,504 | 11/1994 | Huang | 33/451 |

FOREIGN PATENT DOCUMENTS

| 138788 | 7/1949 | Australia | 33/185 |
|---|---|---|---|
| 489775 | 6/1970 | Switzerland | 33/626 |

*Primary Examiner*—Diego Gutierrez
*Assistant Examiner*—Maria Fernandez

[57] ABSTRACT

A cutting block alignment mechanism is provided including a mounting assembly adapted to releasably couple to a cutting block of a cutting drum. Next provided is a bracket for releasaby engaging a cutting tool of the cutting block. The bracket is adapted to be selectively lowered and moved laterally with respect to the mounting assembly.

8 Claims, 2 Drawing Sheets

ALIGNMENT JIG

BACKGROUND OF THE INVENTION

1. Field of the Invention

The present invention relates to pavement grinders and more particularly pertains to a new ALIGNMENT JIG for aligning cutting blocks on the drums and wheels of pavement grinders, groovers, and trenching machines as they are welded in place for providing optimal efficiency.

2. Description of the Prior Art

The use of pavement grinders is known in the prior art. More specifically, pavement grinders heretofore devised and utilized are known to consist basically of familiar, expected and obvious structural configurations, notwithstanding the myriad of designs encompassed by the crowded prior art which have been developed for the fulfillment of countless objectives and requirements.

Known prior art pavement grinders include U.S. Pat. No. 5,233,744; U.S. Pat. No. 5,257,442; U.S. Pat. Des. 344,529; U.S. Pat. No. 4,450,611; U.S. Pat. No. 4,869,417; and U.S. Pat. Des. 342,747.

In these respects, the ALIGNMENT JIG according to the present invention substantially departs from the conventional concepts and designs of the prior art, and in so doing provides an apparatus primarily developed for the purpose of aligning cutting blocks on the drums and wheels of pavement grinders, groovers, and trenching machines as they are welded in place for providing optimal efficiency.

SUMMARY OF THE INVENTION

In view of the foregoing disadvantages inherent in the known types of pavement grinders now present in the prior art, the present invention provides a new ALIGNMENT JIG construction wherein the same can be utilized for aligning cutting blocks on the drums and wheels of pavement grinders, groovers, and trenching machines as they are welded in place for providing optimal efficiency.

The general purpose of the present invention, which will be described subsequently in greater detail, is to provide a new ALIGNMENT JIG apparatus and method which has many of the advantages of the pavement grinders mentioned heretofore and many novel features that result in a new ALIGNMENT JIG which is not anticipated, rendered obvious, suggested, or even implied by any of the prior art pavement grinders, either alone or in any combination thereof.

To attain this, the present invention generally comprises a magnetic mounting assembly which includes a pair of spaced rectilinear vertical members each parallel with respect to each other. Such vertical members are coupled together at top ends thereof by a rectilinear horizontal member. As shown in FIG. 3, the rectilinear horizontal member has a threaded aperture formed in a central extent thereof about a vertical axis. Next provided is a sliding assembly including a horizontally oriented plate with a rectilinear configuration having a top face, a bottom face, a front face, a rear face, and a pair of side faces. The sliding assembly further has an elongated slot formed between the top face and bottom face. Such slot preferably resides adjacent to and in parallel with the rear face of the plate. In use, a sliding bolt may be situated through the slot and in threaded engagement with the threaded aperture of the horizontal member of the magnetic assembly. As such, the plate may be selectively slid laterally with respect to the magnetic assembly. Positioned on the top face of the plate adjacent the rear face thereof is incremental measurement indicia. An upstanding portion is coupled to the top face of the plate adjacent the front face thereof and extended upwardly therefrom. The upstanding member has a cylindrical bore formed in an upper extent thereof. It should be noted that an axis about which the bore is situated forms an acute angle with the plane in which the plate resides. The upstanding member further includes a threaded aperture formed in a side extent thereof and in communication with the cylindrical bore. Also included is a bracket assembly comprising a cylindrical post slidably positioned within the cylindrical bore of the sliding assembly. A first set screw is included which may be threadedly engaged with the threaded aperture of the sliding assembly. By this structure, the cylindrical post may be selectively slid with respect to the upstanding member. The bracket assembly further includes a bracket with an inverted U-shaped configuration which resides within a vertical plane. An outboard linear connector has a first end coupled to a top extent of the bracket wherein the outboard linear connector is extended rearwardly and in parallel with the cylindrical post. Associated therewith is an inboard linear connector having a first end coupled to the outboard linear connector and a second end perpendicularly coupled to an annular sleeve. Such annular sleeve is in turn situated about a bottom end of the cylindrical post of the sliding assembly. The annular sleeve has a threaded aperture formed therein for receiving a second set screw. Such structure allows for the selectively sliding and rotating of the bracket with respect to the cylindrical post.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new ALIGNMENT JIG apparatus and method which has many of the advantages of the pavement grinders mentioned heretofore and many novel features that result in a new ALIGNMENT JIG which is not anticipated, rendered obvious, suggested, or even implied by any of the prior art pavement grinders, either alone or in any combination thereof.

It is another object of the present invention to provide a new ALIGNMENT JIG which may be easily and efficiently manufactured and marketed.

It is a further object of the present invention to provide a new ALIGNMENT JIG which is of a durable and reliable construction.

An even further object of the present invention is to provide a new ALIGNMENT JIG which is susceptible of a low cost of manufacture with regard to both materials and labor, and which accordingly is then susceptible of low prices of sale to the consuming public, thereby making such ALIGNMENT JIG economically available to the buying public.

Still yet another object of the present invention is to provide a new ALIGNMENT JIG which provides in the apparatuses and methods of the prior art some of the advantages thereof, while simultaneously overcoming some of the disadvantages normally associated therewith.

Still another object of the present invention is to provide a new ALIGNMENT JIG for aligning cutting blocks on the drums and wheels of pavement grinders, groovers, and trenching machines as they are welded in place for providing optimal efficiency.

Even still another object of the present invention is to provide a new ALIGNMENT JIG that includes a mounting assembly adapted to releasaby couple to a cutting block of a cutting drum. Next provided is a bracket for releasably engaging a cutting tool of the cutting block. The bracket is adapted to be selectively lowered and moved laterally with respect to the mounting assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
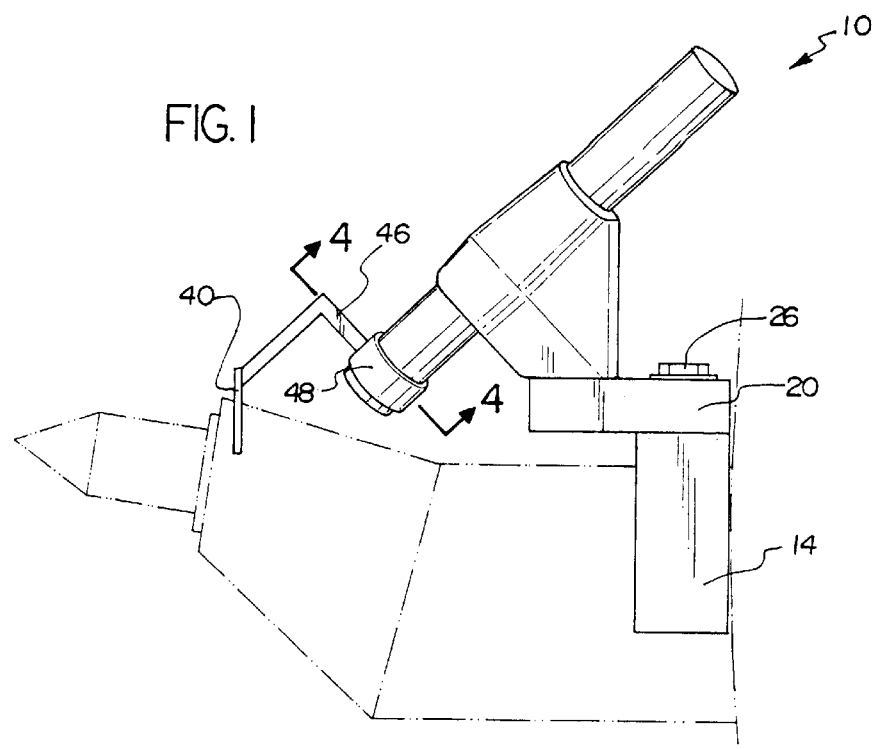
FIG. 1 is a side view of a new ALIGNMENT JIG according to the present invention.

With reference now to the drawings, and in particular to FIGS. 1 through 4 thereof, a new ALIGNMENT JIG embodying the principles and concepts of the present invention and generally designated by the reference numeral 10 will be described.

Figure 2:
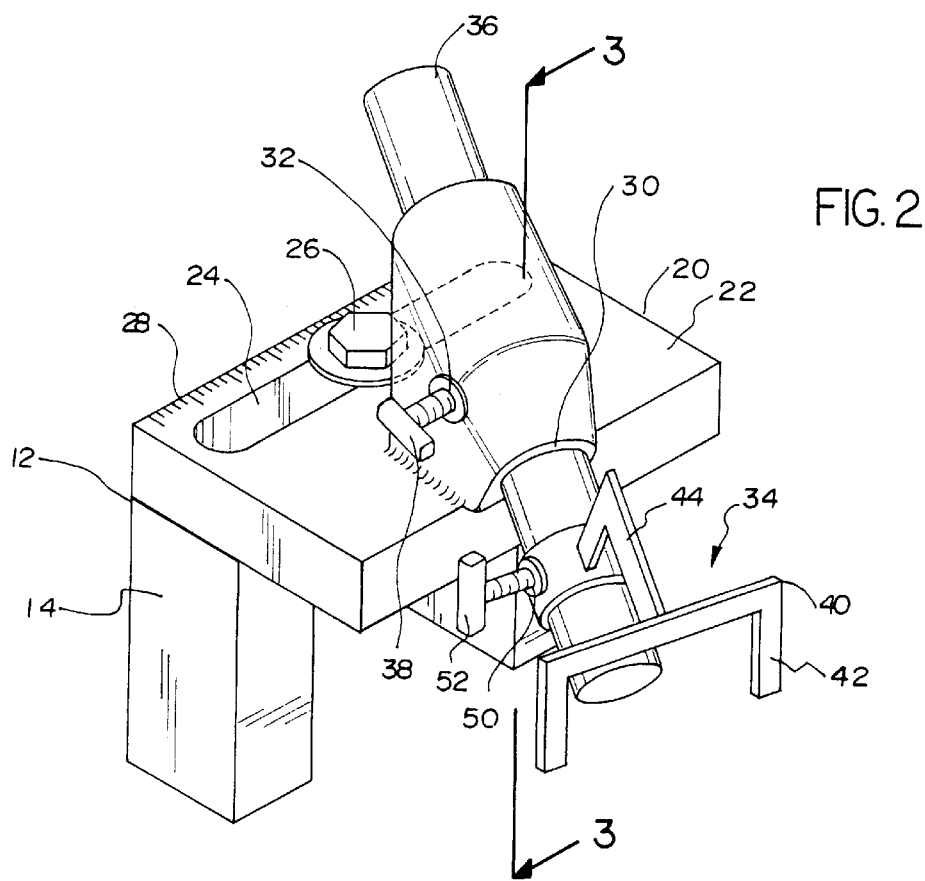
FIG. 2 is a perspective view of the present invention.
Figure 3:
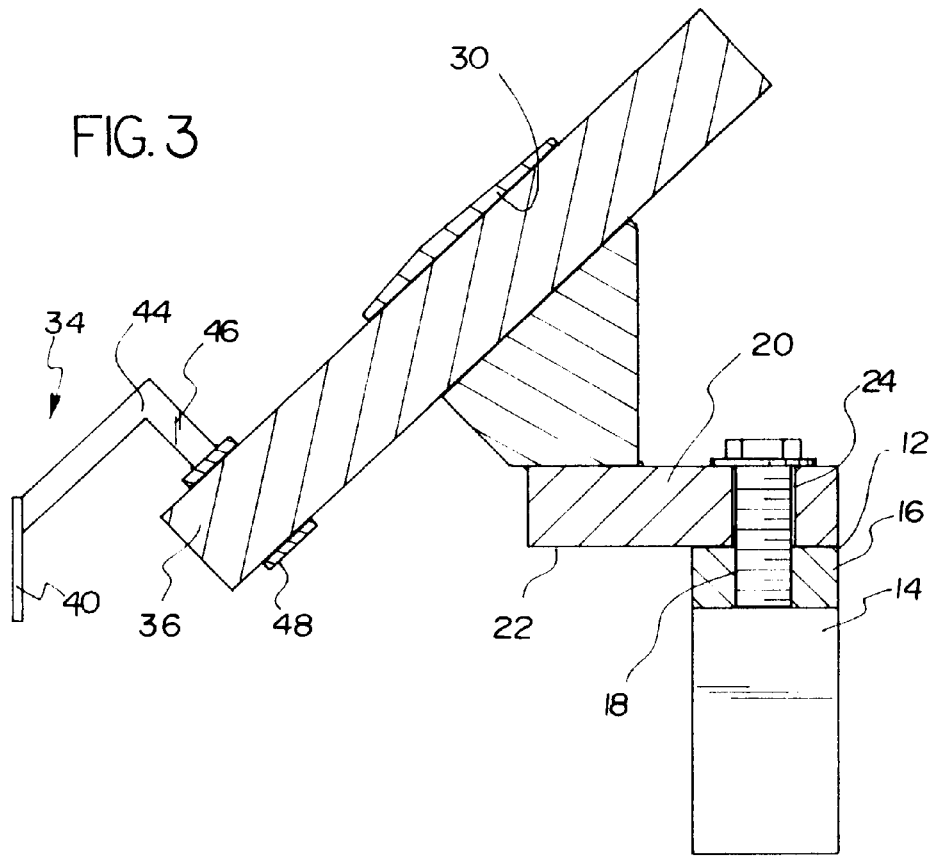
FIG. 3 is a cross-sectional view of the present invention taken along line 3—3 shown in FIG. 2.
Figure 4:
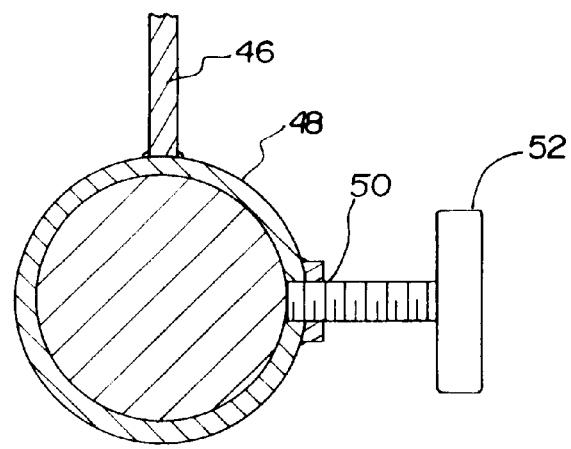
FIG. 4 is a cross-sectional view of the present invention taken along line 4—4 shown in FIG. 1.

As best shown in FIG. 2, a magnetic mounting assembly 12 is provided which includes a pair of spaced rectilinear vertical members 14 each parallel with respect to the other. Such vertical members are coupled together at top ends thereof by a rectilinear horizontal member 16. As shown in FIG. 3, the rectilinear horizontal member has a threaded aperture 18 formed in a central extent thereof about a vertical axis. As an option, an additional coupling means such as a set screw may be associated with the mounting assembly for reasons that will become apparent later.

Next provided is a sliding assembly 20 including a horizontally oriented plate 22 with a rectilinear configuration having a top face, a bottom face, a front face, a planar rear face, and a pair of side faces. Preferably, the plate has a length of 3 inches and a width of 2 inches. The sliding assembly further has an elongated slot 24 formed between the top face and bottom face. Such slot preferably resides adjacent to and in parallel with the rear face of the plate. In use, a sliding bolt 26 may be situated through the slot and in threaded engagement with the threaded aperture of the horizontal member of the magnetic assembly. As such, the plate may be selectively slid laterally and fixed with respect to the magnetic assembly.

Positioned on the top face of the plate adjacent the rear face thereof is incremental measurement indicia 28. An upstanding portion 29 is integrally coupled to the top face of the plate adjacent the front face thereof and extended upwardly therefrom. The upstanding member has a cylindrical bore 30 formed in an upper extent thereof. It should be noted that an axis about which the bore is situated forms an acute angle of about 45 degrees with the plane in which the plate resides. The upstanding member further includes a threaded aperture 32 formed in a side extent thereof and in communication with the cylindrical bore.

Also included is a bracket assembly 34 comprising a cylindrical post 36 slidably positioned within the cylindrical bore of the sliding assembly. The post has a length of 4 inches. A first T-shaped set screw 38 is included which may be threadedly engaged with the threaded aperture of the sliding assembly. By this structure, the cylindrical post may be selectively slid along its axis and fixed with respect to the upstanding member.

The bracket assembly further includes a bracket 40 with an inverted U-shaped configuration which resides within a vertical plane. Ideally, the U-shaped bracket has a pair of prongs 42 which are spaced 1 and ⅝ inches. An outboard linear connector 44 has a first end coupled to a top extent of the bracket wherein the outboard linear connector is extended rearwardly and in parallel with the cylindrical post. Associated therewith is an inboard linear connector 46 having a first end coupled to the outboard linear connector and a second end perpendicularly coupled to an annular sleeve 48. Such annular sleeve is in turn situated about a bottom end of the cylindrical post of the sliding assembly. The annular sleeve has a threaded aperture 50 formed therein for receiving a second T-shaped set screw 52. Such structure allows for the selectively sliding and rotating of the bracket with respect to the cylindrical post.

In use, the magnetic sliding assembly is adapted to straddle a cutting block of a cutting drum such that the rear face of the sliding assembly abuts the cutting drum. The bracket straddles a cutting tool which is connected to the cutting block for maintaining the cutting tool fixed in a desired orientation with respect to the cutting drum. Such desired location may be determined with the aid of the incremental measurement indicia. Once the desired orientation is attained, the sliding bolt and set screws may be secured so that the present invention may be utilized with the remaining cutting tools of the drum such that each of the cutting tools have a common relative orientation. As such, once oriented in the appropriate orientation each cutting tool may be fixed in relation to the cutting drum by way of a weld or other coupling method in the desire orientation.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cutting block alignment mechanism comprising, in combination:

a magnetic mounting assembly including a pair of spaced rectilinear vertical members each parallel with respect to each other and coupled together at top ends thereof by a rectilinear horizontal member, the rectilinear horizontal member having a threaded aperture formed in a central extent thereof about a vertical axis;

a sliding assembly including a horizontally oriented plate with a rectilinear configuration having a top face, a bottom face, a front face, a rear face, and a pair of side faces, the sliding assembly further having an elongated slot formed between the top face and bottom face thereof adjacent to and in parallel with the rear face thereof such that a sliding bolt may be situated through the slot and in threaded engagement with the threaded aperture of the horizontal member of the magnetic assembly whereby the plate may be selectively slid laterally with respect to the magnetic assembly, incremental measurement indicia positioned on the top face of the plate adjacent the rear face thereof, and an upstanding portion integrally coupled to the top face of the plate adjacent the front face thereof and extending upwardly therefrom, the upstanding portion having a cylindrical bore formed in an upper extent thereof wherein an axis about which the bore is situated forms an acute angle with the plane in which the plate resides, the upstanding member further including a threaded aperture formed in a side extent thereof and in communication with the cylindrical bore;

a bracket assembly including a cylindrical post slidably positioned within the cylindrical bore of the sliding assembly such that a first set screw may be threadedly engaged with the threaded aperture of the sliding assembly for allowing the selective sliding of the cylindrical post with respect to the upstanding member, the bracket assembly further including a bracket with an inverted U-shaped configuration and residing within a vertical plane, an outboard linear connector having a first end coupled to a top extent of the bracket and extending rearwardly and parallel with the cylindrical post, an inboard linear connector having a first end coupled to the outboard linear connector and a second end perpendicularly coupled to an annular sleeve which is in turn situated about a bottom end of the cylindrical post of the sliding assembly, the annular sleeve having a threaded aperture formed therein for receiving a second set screw for allowing the selectively sliding and rotating of the bracket with respect to the cylindrical post;

whereby the magnetic sliding assembly is adapted to straddle a cutting block of a cutting drum such that the rear face of the sliding assembly abuts the cutting drum and the bracket straddles a cutting tool which is connected to cutting block for maintain the cutting tool fixed in a desired orientation with respect to the cutting drum so that the cutting tool may be fixed in relation to the cutting drum in the desire orientation.

2. A cutting block alignment mechanism:

a mounting assembly adapted to releasably couple to a cutting block of a cutting drum;

a bracket for releasaby engaging a cutting tool of the cutting block, the bracket adapted to be selectively lowered with respect to the mounting assembly; and a sliding assembly including a plate with a rectilinear configuration having a top face, a bottom face, a front face, a rear face, and a pair of side faces, the sliding assembly further having an elongated slot formed therein such that a sliding bolt may be situated through the slot and in threaded engagement with a threaded aperture of the magnetic assembly, whereby the plate may be selectively slid laterally with respect to the magnetic assembly, wherein the bracket is connected to the plate of the sliding assembly.

3. A cutting block alignment mechanism as set forth in claim 2 wherein the bracket is further adapted to be selectively moved laterally with respect to the mounting assembly.

4. A cutting block alignment mechanism as set forth in claim 2 wherein the bracket is further adapted to be selectively rotated within a plane which is perpendicular with respect to the mounting assembly.

5. A cutting block alignment mechanism as set forth in claim 2 wherein a position of the bracket is selectively fixed with respect to the mounting assembly by way of a set screw.

6. A cutting block alignment mechanism as set forth in claim 2 wherein the mounting assembly is constructed from a magnetic material.

7. A cutting block alignment mechanism as set forth in claim 2 wherein incremental measurement indicia is positioned on the top face of the plate adjacent the rear face thereof.

8. A cutting block alignment mechanism as set forth in claim 2 and further including an upstanding portion integrally coupled to the top face of the plate and extending upwardly therefrom, the upstanding member having a cylindrical bore formed therein wherein an axis about which the bore is situated forms an acute angle with the plane in which the plate resides, the upstanding portion further including a threaded aperture formed in a side extent thereof and in communication with the cylindrical bore, and further including a cylindrical post slidably positioned within the cylindrical bore of the sliding assembly with the bracket coupled thereto.

* * * * *